United States Patent [19]

Röwe et al.

[11] 3,970,161
[45] July 20, 1976

[54] MOTOR VEHICLE

[75] Inventors: Wilhelm Röwe, Willich; Jost Gerresheim, Dusseldorf, both of Germany

[73] Assignee: International Harvester Company, Chicago, Ill.

[22] Filed: July 24, 1975

[21] Appl. No.: 598,606

[30] Foreign Application Priority Data
July 31, 1974  Germany............................ 2436953

[52] U.S. Cl............................. 180/54 A; 180/68 P; 181/33 K; 280/762
[51] Int. Cl.²......................................... B60K 11/04
[58] Field of Search ............. 180/68 P, 68 R, 54 A; 280/150 E; 181/33 K, 36 D, 50

[56] References Cited
UNITED STATES PATENTS

| | | | |
|---|---|---|---|
| 1,751,739 | 3/1930 | Jacobson | 180/68 P |
| 3,029,088 | 4/1962 | Loef | 280/150 E |
| 3,179,197 | 4/1965 | Peras | 180/54 A |
| 3,779,341 | 12/1973 | Huggins | 181/50 |
| 3,857,453 | 12/1974 | Buttke et al. | 180/54 A |
| 3,897,850 | 8/1975 | Thompson et al. | 181/33 K |

Primary Examiner—M. H. Wood, Jr.
Assistant Examiner—David M. Mitchell
Attorney, Agent, or Firm—Ronald C. Kamp; Floyd B. Harman

[57] ABSTRACT

An air circulation control unit, that can be secured over the grill frame of a vehicle, has an upper portion defining a vertical passage and a protruding lower portion. Exhaust outlets are provided at a plurality of different levels and baffles are positioned with said unit to separate the cooling air flow into a plurality of air streams for exit through the outlets.

5 Claims, 6 Drawing Figures

MOTOR VEHICLE

This invention relates to a motor vehicle driven by an internal combustion engine and provided with a cooling system arranged in the vicinity of a grill frame provided with grill-type (grilled) openings.

At an increasing rate continuously rising demands are made to achieve a reduced noise emission. On motor vehicles the noise sources chiefly to be considered are the rolling noise produced by the contact of tire on road, the engine noise, the noise emitted by the exhaust system, and the noise coming from the carriage. Tests proved that in many cases the internal combustion engine is the main source of noise. Experts are well aware of the fact that any improvements on the noise emission first of all requires a reduction of the noise emitted by the main source of noise. Emanating from the internal combustion engine, the noise can propagate by both, airborne sound and solid-borne sound (mechanical vibration). Generally, four different measures are applied to reduce noise:

the absorption of airborne sound, the insulation of airborne sound, the insulation of solid-borne sound, and the absorption of solid-borne sound.

When insulating airborne sound, one endeavours to acoustically separate neighbouring compartments by means of separating walls with a high weight per unit area. The aim is to eliminate as much as possible any vibration of the separating wall caused by airborne sound striking said wall, so that none or only a negligible quanity of airborne sound can radiate into the neighbouring compartment.

Generally, the absorption of airborne sound is to be understood as an eliminating of sound reflection on the smooth walls of interior spaces. To effect the absorption of airborne sound the application of porous materials is considered a beneficial measure, since in the pores the intermittent motion of the air is suppressed by friction on the walls of the pores.

In practical application the measures described above are applied individually or in combination more or less successfully. The difficulties encountered can chiefly be traced back to the fact that noise protection measures are not only expensive, but also require a lot of space which on the machines already available is normally non-existent and on newly developed machines is available only to a very limited extent. Furthermore, components required for sound protection measures e.g. covering panels, etc. must neither obstruct the vision of the operator driving the motor vehicle and thus impair the maneuverability of the vehicle, nor must they change the contour of the motor vehicle to an extent no longer justifiable. Components required for noise reduction must be safeguarded against damage as much as this is possible; they must meet legal requirements; and they must provide facilities to fit auxiliary equipment as for example lighting equipment. Finally, noise reduction measures must not impair the performance of a motor vehicle too much, as for example this is the case with a complete encasing of an internal combustion engine, where an inasmissibly high localization of heat develops within the engine compartment.

The invention is based on the realization that adequate noise reduction measures can only be applied, if simultaneously the factors influencing the efficiency of the motor vehicle are taken into consideration.

Based on this conclusion this invention starts by stating that with any further extensive encasing of the internal combustion engine special attention ought to be given to the channelling of the incoming and outgoing air required for cooling the engine, since a considerable reduction of the sound level can be achieved by an appropriate control of the cooling air flow.

Therefore, the invention is based on the objective of developing a motor vehicle of the initially mentioned type, on which noise reduction measures can be effected by simple means of design, with only negligible interference with the design of the motor vehicle, and with almost complete maintaining of the original drive power (performance). According to the invention the above mentioned objective is achieved by designing a box-type air circulation system as a unit detachable from the vehicle, whereby said unit is connected airtight to the grilled openings of the grill frame and is used to effect a multiple deflection of the spent air over several levels. By this repeated diverting of the cooling-air-flow on the one hand a muffling of the noise is achieved and on the other hand a direct emerging of the sound is prevented. By this measure alone a considerable reduction of the noise level is achieved without having to line the air-circulating box with suitable insulating material. To effect an additional noise reduction it is of course possible to fit the inner walls of the air-circulating box with suitable insulating materials. Furthermore, as regards this invention it is also of importance that the air-circulation box is in airtight assembly with the grille openings (slots), so that the cooling air must follow the forced flow specified by the air-circulation box and cannot follow any uncontrolled flow as this is the case with known vehicles, where a rearward sloped air guide is provided in the vicinity of the grill frame.

Finally, yet another important feature of the invention can be seen in the air-circulation box being designed as one structural unit which can be mounted on the vehicle e.g. the grill frame in a detachable manner. This makes it possible to subsequently install air-circulation boxes on already existing motor vehicles and to operate motor vehicles during certain operations, where there is no need for any considerable noise reduction, without the air-circulation box described in this invention.

As appropriate design according to the invention shows the air-circulation box with a mainly vertical shaft which is in connection with the openings provided in the grill. By way of its bottom end said shaft is connected to an inlet opening of a main box extending laterally alongside as well as below the grill frame. The outward ends of the main box are provided with connecting members running parallel to the longitudinal axis of the motor vehicle. On these connecting members mountable cases are placed which have one each top outlet opening connected to passages provided in the top faces of the connecting members. In an ingenious manner the use of such an air-circulation box creates on limited space a comparatively long sound damping path which produces the desired noise reduction. The air-circulation box is so well placed in the vicinity of the grill frame that on the one hand it conforms well to the overall appearance of the motor vehicle and on the other hand it does not obstruct the operator's vision. Furthermore, by its ideal utilization of space the fitting of essential auxiliary equipment, like lighting equipment, etc., is not impaired.

It is of advantage to keep a top section of the grill type openings in the grill frame closed and to arrange in the vicinity of the lower, open section of the grill type openings partly upward and partly downward bent air guide blades inside the shaft which itself has a discharge opening at the top end. By means of said air guide blades the spent air emerging from the engine compartment can (first of all) be split into two component flows. After entering the shaft one of the flows guided by the upward bent air guide blades can emerge by way of the outlet provided at the shaft's top end, while the second flow of spent air guided by the downward bent air guide blades can pass the main box and by way of the connecting members can flow into the mountable cases, where it emerges through the outlet openings provided in their top area.

To achieve an effective air flow, upward bent and fan like arranged air guide blades are provided inside the main box in the vicinity of its inlet opening and/or inside the connecting members in the vicinity of the passages provided in the top face of said connecting members.

It is also of advantage if the main box is designed in form of two symmetric sectional chambers, separated airtight by a partition extending concentric to the shaft. By the above design the following is achieved:

directly after splitting the air flow in vertical direction, the downward diverted air is separated into two horizontal air flows which escape into the atmosphere through either sectional chamber by way of the in each case associated mounted cases. By this technique of splitting the entire volume of spent air into several component flows, any detrimental choking effect on the flow and subsequent frictional loss is prevented, so that no dynamic pressure impairing the performance of the motor vehicle can develop.

This invention is of particular advantage to motor vehicles equipped with a ballast weight. Normally, such motor vehicles, e.g. industrial loaders, carry at their rear end facing the grill frame a ballast weight extending over the entire width of the grill frame. According to the invention it is planned to design the main box of the air-circulation box in form of a ballast weight, which means that instead of the ballast weight normally mounted at this location, the main box of the air-circulation box is bolted to the grill frame or to the vehicle frame. In cases where such an air-circulation box is designed in form of a balance weight at the passages to the individual air-circulation levels it is provided with walls running at an incline to said levels. Into the remaining spaces between the partitions and the outer walls of the air circulation box which run at the air-circulation levels, additional ballast material can be filled. Therefore, dependent on operating conditions and size of the motor vehicle, additional ballast material can at will be filled into the spaces mentioned above. Furthermore, by appropriate dimensioning of the wall thickness on the air-circulation box, so heavy a weight can be attained that the normally customary weight of the former ballast weights is almost obtained. It stands to reason that the thickness of the walls is selected such that there is no droning noise from the air-circulation box. A preferred embodiment according to the invention is pictured in the drawing and is presented in detail as follows:

Figure 1:
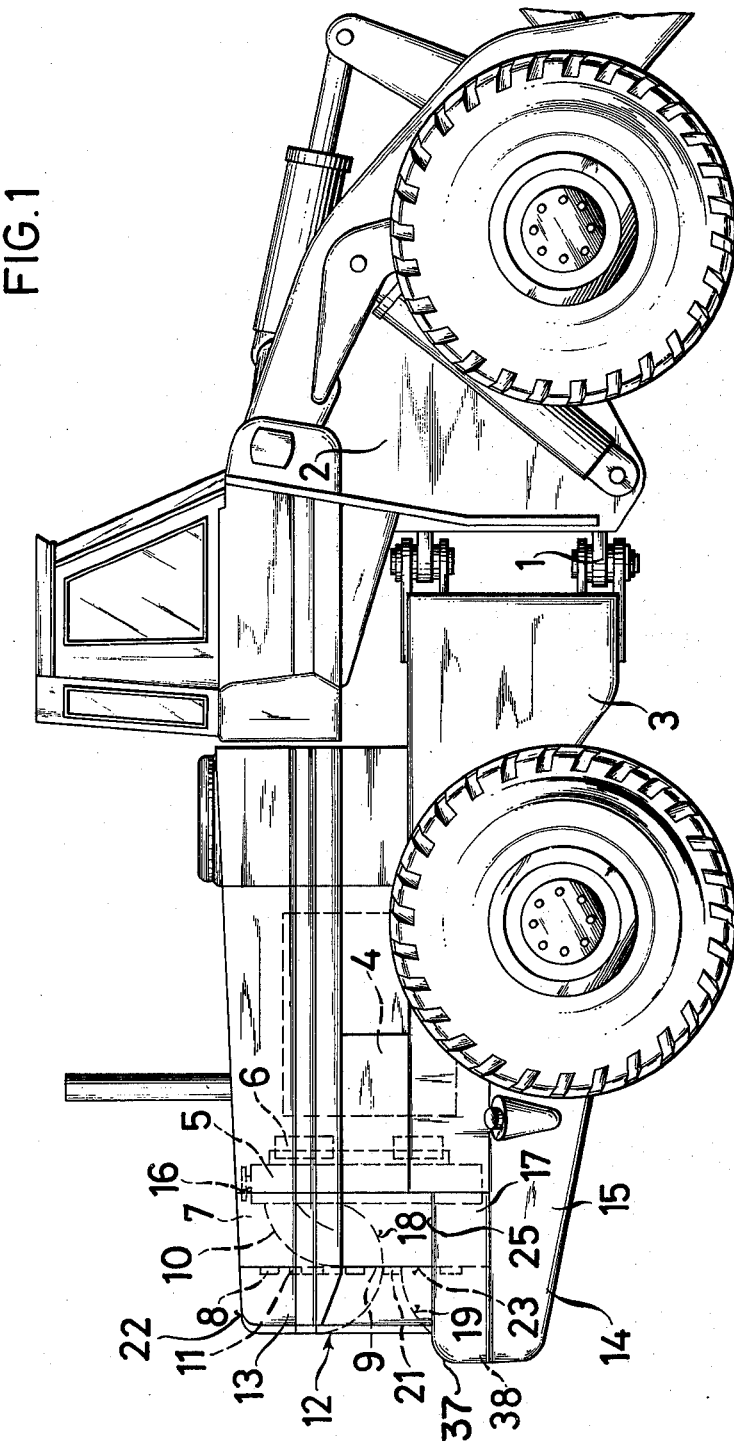
FIG. 1 shows: the lateral view of a loader featuring an air-circulation box according to the invention mounted at the rear of the vehicle.
Figure 2:
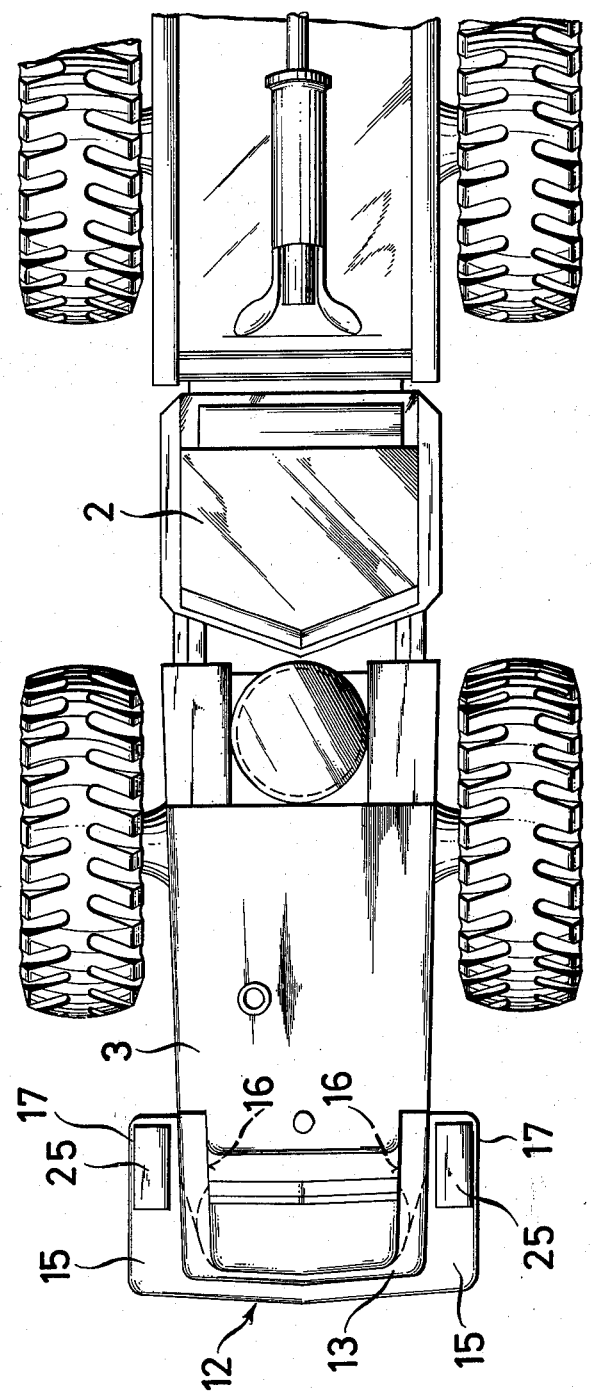
FIG. 2 shows: the appertaining top view of the vehicle.

The motor vehicle pictured in the FIGS. 1 and 2 is a loader with a front vehicle 2 and a rear vehicle (caisson) 3 supported in a pivoted manner on an articulated joint (fifthwheel) 1. In the rear vehicle 3 an internal combustion engine 4 with a water radiator 5 and a cooling system with fan 6 is accommodated in a known manner. At the rear end of the rear vehicle 3 a grill-frame 7 with openings 9 between the grill-bars 8 is arranged. The top section of the normally open grill-slots 9 is closed by means of a baffle means or plate 11. In the area between the plate 11 and the water radiator 5 several downward-bent air-guide blades 10 are provided.

Through the intermediary of sealing strips 16 an air-circulation box 12 (described in detail later on) is connected airtight to the grill-frame 7. Said air-circulation box 12 mainly consits of a vertical shaft 13 connected to the openings 9 in the grill, and fitted to its bottom end a main box 14. At the outer ends of said main box 14 connecting members 15 are arranged, on the top face of which mountable cases 17 are fitted. In the area of the lower grill openings 9, which are actually open, upward-bent air blades 18 and downward-bent air-guide blades 19 extend into the vertical shaft 13 of the air-circulation box 12. The space between upward and downward-bent air-guide blades 18, 19 is sealed by means of a strip 21.

The cooling air, drawn in through an intake opening which is arranged in the centre area of the vehicle but is not shown in detail, can flow along the internal combustion engine 4, from where it can pass by way of the fan 6 through the water cooler or radiator 5 into the area of the grill frame 7 and the air-guide blades 18 and 19 fitted there onto the grill-bars 8. Since the area between the air-guide blades 18, 19 is blocked by the strip 21, the spent air is partly diverted in upward direction by way of the air-guide blades 18 and a top discharge opening 22 of the shaft 13, whereas the other part is diverted in downward direction by way of the air-guide blades 19 and via an inlet opening 23 provided on the main box 14 into said main box 14 and thus into the connecting members 15. From the connecting members 15 and via a passage 24 (FIG. 3) provided in their top face, the air can flow into the mountable cases 17, from where it can escape into the atmosphere by way of a discharge opening 25 provided in their top face.

Figure 3:
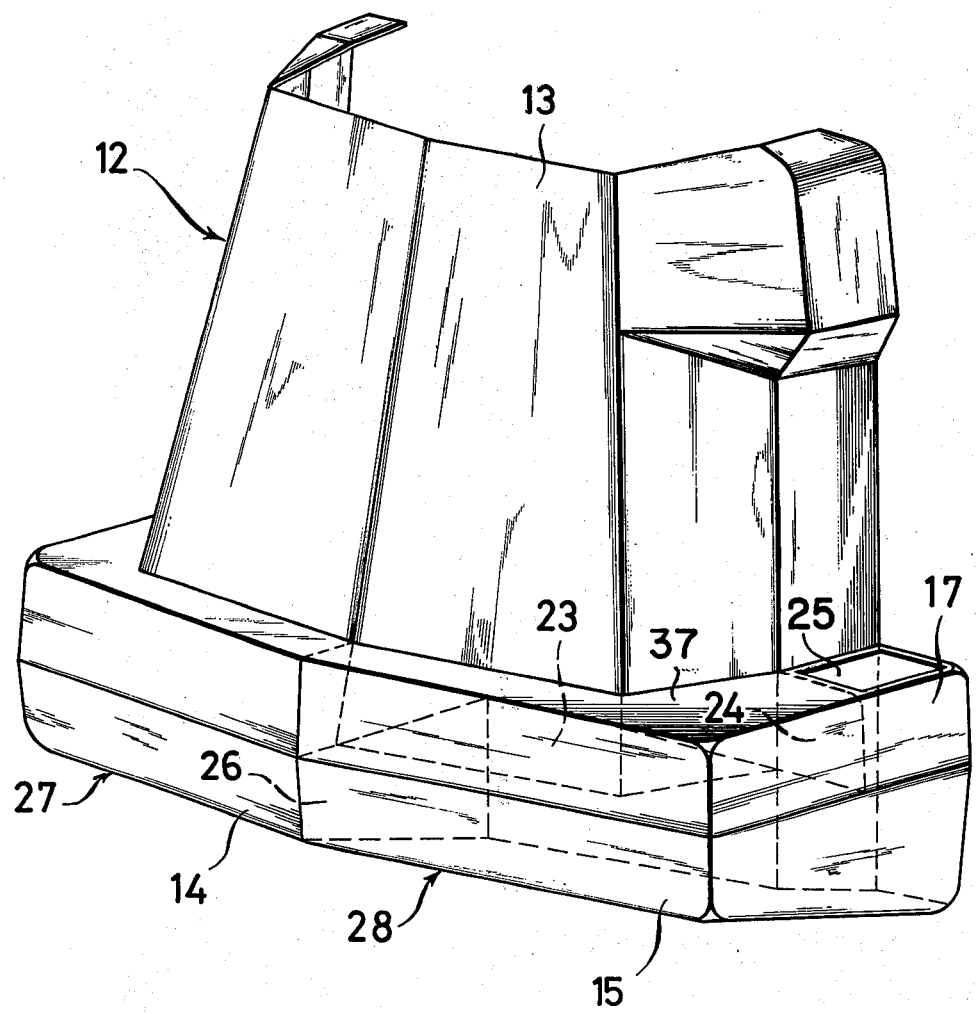
FIG. 3 shows: an air-circulation box according to the invention in perspective view.

FIG. 3 shows that the main box 14 runs in mainly horizontal direction, and that connecting members 15 are joined to it which extend parallel to the longitudinal axis of the vehicle. Rectangular in upward direction mountable cases 17 are fitted. By this method of deflecting the circulating air over several levels, a muffling path of considerable length is produced on a very compact area which in turn results in a considerable reduction of the noise level. To improve the air distribution required in the air-circulation box, the main box 14 of the air-circulation box 12 is split into two symmetric sections 27, 28 by means of a separating wall 26 extending centric to the shaft 13. Both sections 27, 28 are separated airtight by the separating wall 26, so that after the deflection of air effected by the air-guide blades 18, 19 yet another diversion of the air-flow is effected in the main box 14, and the air-circulation required in the air-circulation box 12 is achieved.

Figure 4:
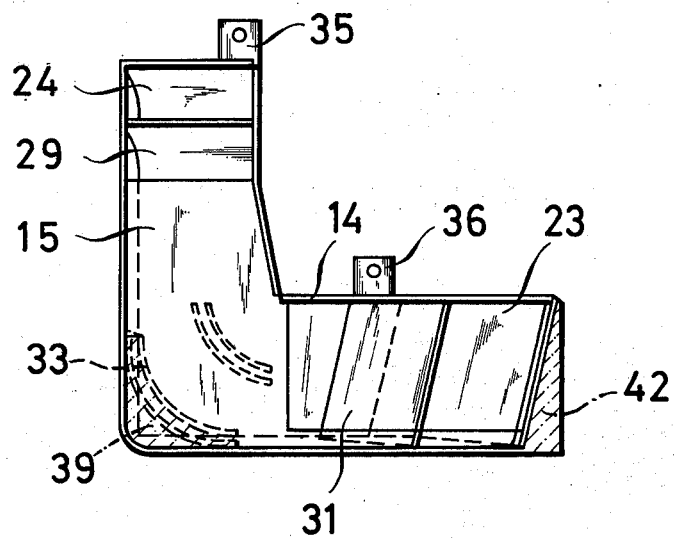
FIG. 4 shows: part of a main box of the air-circulation box shown in top view.
Figure 5:
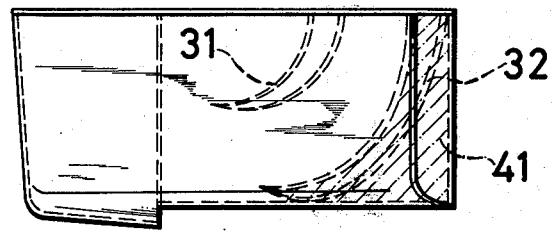
FIG. 5 shows: the appertaining front view.
Figure 6:
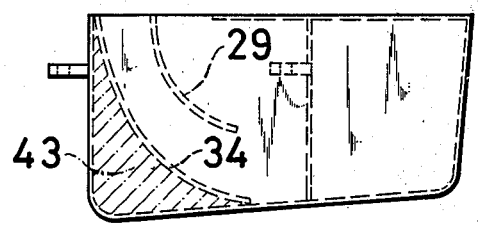
FIG. 6 shows: the appertaining lateral view.

To produce an effective airflow within the air-circulation box 12 fan-like arranged air-guide blades 29, 31 facilitating the circulation from one circulation level to another circulaton level are provided in the area of the inlet 23 of the main box 14 and the passage 24 of the connecting members 15. For the same purpose wall sections 32, 33 and 34 running at an incline to the air-circulation levels are provided at the passages between the individual air-circulation levels. Said design features are shown in detail in the FIGS. 4 through 6. The hatched spaces 39, 41, 42 and 43, remaining between the wall sections 32, 33 and 34, and the outer walls of the air-circulation box 12 (mainly in the area of the air-circulation levels) can be used to carry ballast.

To facilitate mounting of the air-circulation box 12 on the motor vehicle fastening lugs 35, 36 can be provided at the appropriate locations.

To maintain as much as possible the overall appearance after mounting the air-circulation box 12 on the motor vehicle a facing 37 can be provided above the main box 14. As shown in FIG. 1, this facing 37 can extend up to the top face of the mountable cases 17.

With application of the facing 37 it is possible to utilize the space 38 (FIG. 1) between the facing 37 and the lateral walls of the shaft 13 to accomodate additional ballast weights and/or auxiliary equipment like batteries, tool chest, etc.. It is also possible to swing out at least part of the facing 37 to form a stepping or walking area. In this case any maintenance or cleaning work in the grill area of the motor vehicle can easily be preformed.

It is to be understood that the invention is not limited to the embodiment shown, but allows variations within the scope of the claims. Therefore, it would be possible to use the principle of this invention for application on air-cooled internal combustion engines, too. Furthermore, the air-deflector plates and air-guide blades inside the air-circulation box could be of different design and arrangement. Finally, as already mentioned the entire inner walls of the air-circulation box could be lined with insulating material and/or processed in some manner in order to achieve an even more effective noise reduction.

The embodiments of the invention for which an exclusive property or privilege is claimed are defined as follows:

1. In a motor vehicle having a grill frame with top and lower sections, an engine, a radiator for cooling the engine and an engine-driven fan for blowing air through the radiator and out of said grill frame; the improvement comprising:
an air circulation box, having an upper portion and a protruding lower portion including upper faces thereon, connected air tight to said grill frame;
said upper portion defining with said grill frame a substantially vertical passageway;
said protruding lower portion forming a substantially horizontal passageway extending across the width of the vehicle and along the sides thereof essentially parallel to the longitudinal axis of the vehicle;
said horizontal passageway communicating with said vertical passageway adjacent said grill frame; and
at least one outlet opening formed in the upper faces of said protruding lower portion.

2. The invention according to claim 1, and further comprising:
baffle means to close the top section of said grill frame;
air guide means attached to at least one of said grill frame and said air circulation box and positioned intermediate the lower section of said grill frame, said guide means including an upper guide blade for deflecting air up said vertical passageway and a lower guide blade for deflecting air downward into said horizontal passageway; and
said vertical shaft is provided with an outlet opening at its upper end.

3. The invention according to claim 2, and further comprising:
a partition affixed centrally within the protruding lower portion to divide the lower portion into symmetrical sections.

4. The invention according to claim 3, and further comprising:
arcuate wall sections mounted in said lower section substantially tangential to adjacent sides of the lower section.

5. The invention according to claim 4, and further comprising:
ballast material positioned between the transition members and the adjacent sides of the lower section.

* * * * *